US008062798B2

(12) United States Patent
Draper et al.

(10) Patent No.: US 8,062,798 B2
(45) Date of Patent: Nov. 22, 2011

(54) SOLID OXIDE FUEL CELL GENERATOR WITH MID-STACK FUEL FEED (75) Inventors: Robert Draper, Pittsburgh, PA (US);
Paolo R. Zafred, Murrysville, PA (US);
James E. Gillett, Greensburg, PA (US);
Arun K. S. Iyengar, Delmont, PA (US);
Raymond A. George, Pittsburgh, PA (US); Gianfranco DiGiuseppe, Grand Blanc, MI (US)

(73) Assignee: Siemens Energy, Inc., Orlando, FL (US)

( * ) Notice: Subject to any disclaimer, the term of this patent is extended or adjusted under 35 U.S.C. 154(b) by 1076 days.

(21) Appl. No.: 11/870,638

(22) Filed: Oct. 11, 2007

(65) Prior Publication Data
US 2008/0107953 A1    May 8, 2008

Related U.S. Application Data (60) Provisional application No. 60/857,085, filed on Nov. 6, 2006.

(51) Int. Cl.
*H01M 8/06* (2006.01)

(52) U.S. Cl. ........ 429/408; 429/407; 429/415; 429/458; 429/465; 429/466; 429/471; 429/497; 429/508

(58) Field of Classification Search .................. 429/407, 429/408, 415, 458, 465, 466, 471, 497, 508
See application file for complete search history.

(56) References Cited

U.S. PATENT DOCUMENTS

| 4,395,468 A | 7/1983 | Isenberg |
| 4,476,198 A | 10/1984 | Ackerman et al. |
| 4,640,875 A | 2/1987 | Makiel |
| 4,728,584 A | 3/1988 | Isenberg |
| 4,791,035 A | 12/1988 | Reichner |
| 4,874,678 A | 10/1989 | Reichner |
| 4,910,100 A | 3/1990 | Nakanishi et al. |
| 5,047,299 A | 9/1991 | Shockling |
| 5,200,279 A * | 4/1993 | Draper et al. ............... 429/466 |
| 6,376,117 B1 | 4/2002 | Kantak et al. |
| 6,492,048 B1 | 12/2002 | Draper et al. |
| 6,610,434 B1 | 8/2003 | Draper et al. |
| 6,677,069 B1 | 1/2004 | Piascik et al. |
| 6,764,784 B2 | 7/2004 | Gillett et al. |
| 7,157,172 B2 | 1/2007 | Draper et al. |
| 2003/0054209 A1 | 3/2003 | Gillett et al. |
| 2003/0203263 A1 | 10/2003 | Brown et al. |
| 2005/0266288 A1 | 12/2005 | Zafred et al. |
| 2007/0087254 A1* | 4/2007 | Iyengar et al. ............... 429/38 |

* cited by examiner

*Primary Examiner* — Patrick Ryan
*Assistant Examiner* — Ben Lewis (57) ABSTRACT A fuel cell generator including a housing defining a plurality of chambers including a generator chamber having first and second generator sections. A plurality of elongated fuel cells extend through the first and second generator sections. An oxidant supply supplies oxidant to at least one of the chambers within the housing in order to provide oxidant to one end of each of the fuel cells. A fuel distribution plenum extends transversely to the elongated fuel cells and is located between the first and second generator sections. The fuel distribution plenum distributes fuel to the first and second generator sections in opposing directions within the generator chamber.

13 Claims, 8 Drawing Sheets

SOLID OXIDE FUEL CELL GENERATOR WITH MID-STACK FUEL FEED

CROSS-REFERENCE TO RELATED APPLICATIONS

This application claims the benefit of U.S. Provisional Application No. 60/857,085, filed Nov. 6, 2006, which is incorporated herein by reference.

FIELD OF THE INVENTION

The present invention relates to fuel cells and, more particularly, to fuel cell generators including fuel cells that are open at both ends.

BACKGROUND OF THE INVENTION

The dynamics of fuel cell stacks require that preferably fuel enters the stack from the opposite end of where the ambient air enters. As the fuel travels over cells, down the length of the stack, it is subject to electrochemical combustion. Typically a fraction of the unused fuel/combustion products mixture is recirculated, while a fraction is mixed with vitiated air to satisfy the mass balance. In prior art tubular solid oxide fuel cell (SOFC) generators, the SOFC geometry is cylindrical with one closed end. Fuel enters the stack at the cell closed end and flows upward in the space surrounding the cells. Air enters each cell through an air feed tube (AFT) concentrically positioned within the cell, exits the AFT at the closed end, and flows upward in the annular space between the AFT and the cell. As the fuel and air flow from the cell closed end to the open end, most of the fuel is electrochemically reacted with oxygen from the air producing electricity. The depleted fuel exiting the cell stack, which typically consists of 20% ($H_2$+CO) and 80% ($H_2O$+$CO_2$), is combusted with the vitiated air exiting the cell in a combustion zone above the cell open ends to create exhaust gas. In this configuration no seals are required to separate the fuel stream from the air stream due to the closed end design of the tubular SOFC and the use of AFT's. A known construction for this type of fuel cell is described in U.S. Pat. No. 6,764,784.

In a known method of manufacturing closed end fuel cells, the interconnection between cells, the electrolyte and the fuel electrode layers are deposited on an extruded and sintered lanthanum manganite air electrode tube by plasma spray. The lanthanum chromite interconnection is in the form of a narrow strip that runs axially over the entire active length of the cell. A yttria stabilized zirconia electrolyte is deposited in such a way as to almost entirely cover the cell. The electrolyte layer overlaps the edges of the interconnection strip but leaves most of the interconnection exposed. Because the interconnection and electrolyte layers are dense, the overlap feature provides a seal that prevents direct mixing of air and fuel gas. A nickel/yttria stabilized zirconia cermet fuel electrode layer is deposited in such a way as to almost entirely cover the electrolyte, but leaves a narrow margin of electrolyte between the interconnection and the fuel electrode. This margin prevents shorting of the cell. Series electrical connections between cells are accomplished by means of a structure made from nickel foam and nickel screen. The foam part of which becomes sintered to the interconnection while the screen part becomes sintered to the fuel electrode of the adjacent cell. A solid oxide fuel cell according to this construction is described in U.S. Pat. No. 7,157,172, which patent is incorporated herein by reference.

In the above described closed end fuel cell designs, the closed end is a highly stressed region during plasma spray operations performed during manufacturing to deposit the interconnections, the electrolyte, and the fuel electrode. Elimination of the closed end may be expected to reduce failure due to thermal stress and thus significantly increase the yield during manufacturing. Furthermore, elimination of the air feed tubes would represent a substantial cost savings and a design simplification.

In an alternative construction for fuel cell stacks, a mid-sectional fuel distribution construction for fuel cells may be provide, as disclosed in US Patent Application Publication No. 2007/0087254, which patent application is incorporated herein by reference. In this construction, a fuel cell stack is described that comprises an air inlet, a series of fuel cells, a new fuel inlet, a fuel distributor, a recirculation plenum, and an exhaust. In all of the designs presented in this reference, fresh fuel from the fuel distributor enters the fuel cell stack in a middle-third section of the fuel cell stack, and the fresh fuel is divided to flow towards opposite ends of the stack. A common aspect of all of the designs presented in this reference is the fact that no seals are required to separate the fuel stream from the air stream.

It should be noted that in a typical closed end SOFC design, the combustion zone located near the entrance end of the air feed tubes operates to heat the entering air and improve the efficiency of the reaction. Accordingly, in alternative designs such as those that eliminate air feed tubes, it is important to ensure that the entry end of the fuel cell is maintained at a sufficient temperature to avoid negative effects on the cell performance.

There is a continuing need for a fuel cell stack construction that addresses problems associated with manufacturing of fuel cell stacks, while providing a high power density and increased operating efficiencies.

SUMMARY OF THE INVENTION

In accordance with one aspect of the invention, a solid fuel oxide fuel cell generator is provided comprising a housing defining a plurality of chambers including a generator chamber and first and second combustion zones located adjacent to opposite ends of the generator chamber. The generator chamber includes first and second generator sections. A plurality of elongated fuel cells are provided. Each of the fuel cells extends through the first and second generator sections and includes opposing open ends wherein each of the open ends opens into one of the chambers defined within the housing. An oxidant supply supplies oxidant to the housing. A fuel distribution plenum extends transversely to the elongated fuel cells through the generator chamber and is located between and distributes fuel to the first and second generator sections. The first and second combustion zones receive a portion of the fuel passing through the first and second generator sections, respectively.

In accordance with another aspect of the invention, a fuel cell generator is provided comprising a housing defining a plurality of chambers including a generator chamber having first and second generator sections. A plurality of elongated fuel cells are provided. Each of the fuel cells extends through the first and second generator sections and includes opposing open ends wherein each of the open ends opens into one of the chambers defined within the housing. An oxidant supply supplies oxidant to the housing. A fuel distribution plenum extends transversely to the elongated fuel cells through the generator chamber and is located between and distributes fuel to the first and second generator sections. The oxidant passes through a first set of the fuel cells in a first direction and the oxidant passes through a second set of the fuel cells in a second direction opposite to the first direction.

In accordance with a further aspect of the invention, a fuel cell generator is provided comprising a housing defining a plurality of chambers including a generator chamber having first and second generator sections. A plurality of elongated fuel cells are provided, each of the fuel cells extending through the first and second generator sections for conveying oxidant from one end of the housing to an opposite end of the housing. An oxidant supply supplies oxidant to an oxidant chamber at one end of the housing for providing oxidant to an end of each of the fuel cells. A fuel distribution plenum extends transversely to the elongated fuel cells through the generator chamber and is located between and distributes fuel to the first and second generator sections. At least one recirculation plenum is located within the housing and connected to a recirculation circuit for recirculating depleted fuel to the fuel distribution plenum wherein the recirculation plenum is located at an end of the housing opposite from the oxidant chamber.

BRIEF DESCRIPTION OF THE DRAWINGS

While the specification concludes with claims particularly pointing out and distinctly claiming the present invention, it is believed that the present invention will be better understood from the following description in conjunction with the accompanying Drawing Figures, in which like reference numerals identify like elements, and wherein:

DETAILED DESCRIPTION OF THE INVENTION

In the following detailed description of the preferred embodiment, reference is made to the accompanying drawings that form a part hereof, and in which is shown by way of illustration, and not by way of limitation, specific preferred embodiments in which the invention may be practiced. It is to be understood that other embodiments may be utilized and that changes may be made without departing from the spirit and scope of the present invention.

The present invention provides fuel cell stacks that introduce fuel at a mid-span portion of the fuel cell stack, i.e., at a middle portion between opposing ends of the fuel cell stack. As has been noted previously herein, in the prior art, fuel from a fuel distributor is added to an end of a stack opposite from the end where air enters. This arrangement ensures that fresh fuel from the fuel distributor does not mix with the air supply, even if there are leaks in internal barriers. However, the prior art arrangement not only requires elaborate tube within cell arrangements but may also result in economic penalties and fabrication difficulties.

Figure 1:
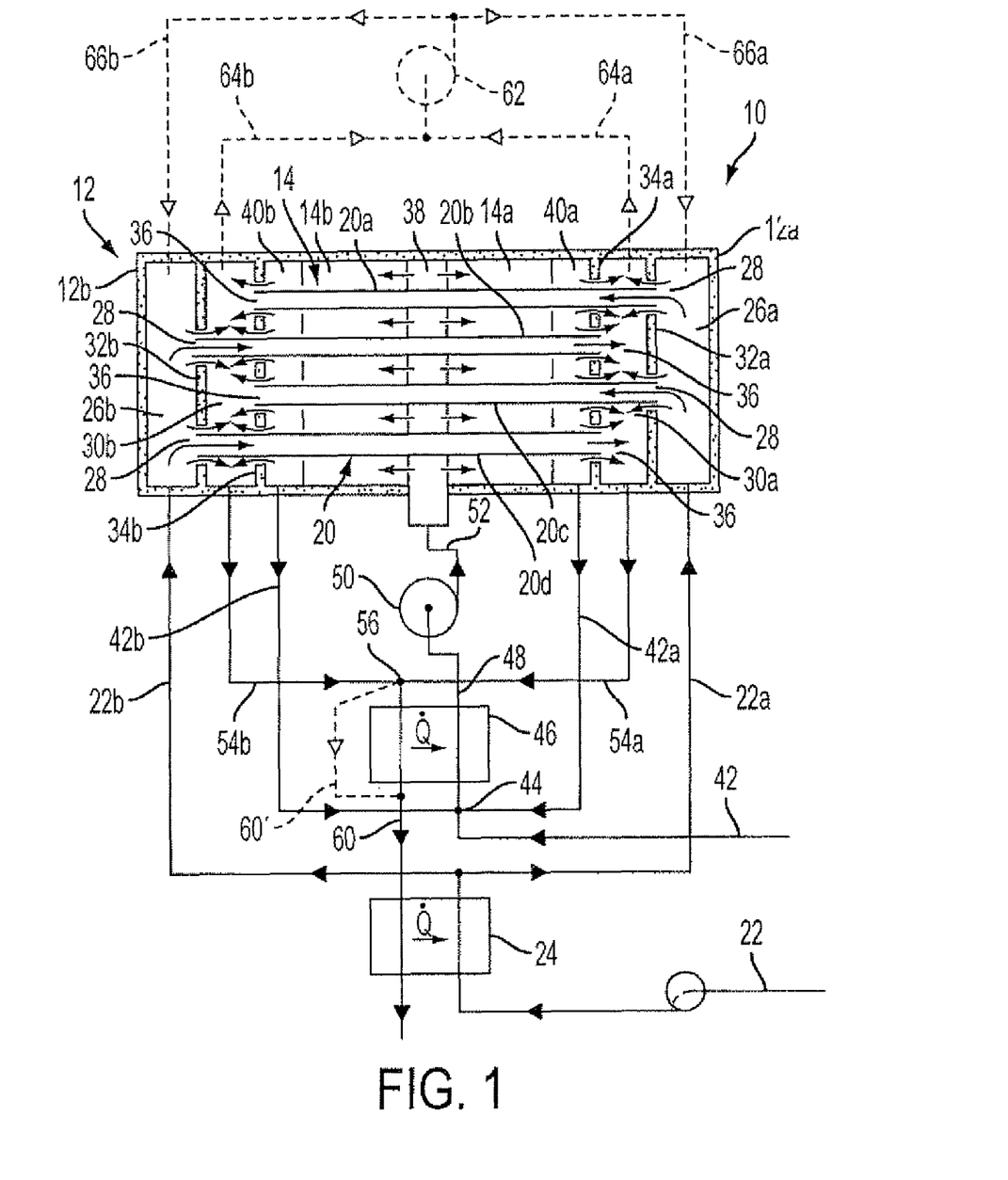
FIG. 1 is a schematic diagram of a first embodiment of a fuel cell generator in accordance with the present invention.

Referring to FIG. 1, a first embodiment of the invention is illustrated comprising a fuel cell generator 10 including a housing 12 defining a plurality of chambers including a generator chamber 14 having a first generator section 14a and a second generator section 14b. The housing 12 further encloses a plurality of elongated fuel cells 20, specifically identified in the schematic diagram of FIG. 1 as 20a, 20b, 20c and 20d. The fuel cells 20 preferably comprise solid oxide fuel cells (SOFC's). Each of the fuel cells 20 extends through both the first generator section 14a and the second generator section 14b for conveying oxidant from one end of the housing 12 to an opposite end of the housing 12. In a typical application of the present invention, the oxidant comprises air, and will hereafter be referred to as such.

Air is supplied to the housing 12 through an air supply line 22 extending to a recuperative air preheater 24 and is subsequently bifurcated to two separate air lines 22a and 22b for conveying the air to the housing 12 wherein air is provided to at least one end of each of the fuel cells 20. In particular, the air line 22a is in communication with a first air chamber 26a at a first end 12a of the housing 12 to provide air to an entry end 28 of a predetermined first plurality of the fuel cells 20a and 20c, and the air line 22b is in communication with a second air chamber 26b at a second end 12b of the housing 12 to provide air to an entry end 28 of a second plurality of the fuel cells 20b and 20d. It should be noted that although only four fuel cells 20 are illustrated, any number of fuel cells 20, and preferably more than four, may be provided in accordance with the present invention, where half of the fuel cells 20 have an entry end at the first air chamber 26a and half of the fuel cells 20 have an entry end at the second air chamber 26b.

A first combustion chamber 30a, defining a first combustion zone, is located within the housing 12 adjacent to the first air chamber 26a, and a first end wall defined by a first end spacer 32a is located between the first air chamber 26a and the first combustion chamber 30a. A first inner wall defined by a first inner spacer 34a separates the first combustion chamber 30a from the generator chamber 14. A second combustion chamber 30b, defining a second combustion zone, is located within the housing 12 adjacent to the second air chamber 26b, and a second end wall defined by a second end spacer 32b is located between the second air chamber 26b and the second combustion chamber 30b. A second inner wall defined by a second inner spacer 34b separates the second combustion chamber 30b from the generator chamber 14. The fuel cells 20 each include an exhaust end 36, where the exhaust ends 36 of the predetermined first plurality of fuel cells 20a, 20c exhausts vitiated air to the second combustion chamber 30b and the exhaust ends 36 of the second plurality of fuel cells 20b, 20d exhausts vitiated air to the first combustion chamber 30a.

A fuel distribution plenum 38 extends through the middle of the housing 12, i.e., midway between the housing ends 12a and 12b, transversely of the direction of elongation of the fuel cells 20. The fuel distribution plenum 38 is located between the first and second generator sections 14a and 14b and distributes fuel in opposite directions to each of the first and second generator sections 14a and 14b.

A first recirculation plenum 40a is located within the housing 12 at an end of the first generator section 14a adjacent the first combustion chamber 30a, and a second recirculation plenum 40b is located within the housing 12 at an end of the second generator section 14b adjacent the second combustion chamber 30b. The first and second recirculation plena 40a, 40b are connected to respective recirculation lines 42a, 42b of a recirculation circuit for recirculating a portion of the depleted fuel to the fuel distribution plenum 38. In particular, the recirculation lines 42a, 42b feed a portion of the depleted fuel from the recirculation plena 40a, 40b to a junction 44 with a fresh fuel supply line 42 upstream from a reformer 46 where a reforming operation, such as is well known in the art, is performed on the fuel. The reformed fuel is conveyed from the reformer 46 through a fuel line 48 to a recirculator 50 to increase the pressure of the reformed fuel for supplying the fuel through a fuel distribution line 52 to the fuel distribution plenum 38.

Combustion product lines 54a and 54b extend from the combustion chambers 30a and 30b to junction 56 where they pass into an exhaust line 60. In a first configuration of the exhaust line 60, the exhaust line 60 extends through the reformer 46 to provide heat to the reformer 46 and then through the recuperative air preheater 24 to provide heat to the incoming air. In a second configuration of the exhaust line 60, a bypass line 60' line is provided at the junction 56 to convey the combustion products directly to the recuperative air preheater 24, while the heat for reformation is provided by the recirculated portion of the unburned fuel and products, i.e., depleted fuel, from the process.

In another variation on the structure of FIG. 1, in the case where a relatively low air temperature in the air chambers 26a, 26b needs to be mitigated, additional heat may be provided from the combustion chambers 30a, 30b. Specifically, a portion of the products from the combustion chambers 30a, 30b may be extracted via an air recirculator 62 drawing a portion of the combustion products through lines 64a, 64b and directing it to the air chambers 26a, 26b through lines 66a, 66b to heat the air passing into the entry ends 28 of the fuel cells 20.

In a process performed by the fuel cell generator 10 in accordance with the embodiment of FIG. 1, air enters the recuperative air preheater 24 where it receives heat from the generator exhaust stream flowing through the exhaust line 60. The air stream then bifurcates to enter air chambers 26a, 26b. The air then flows in a once-through manner through the fuel cells 20 which pass through the electrochemically active generator sections 14a, 14b. Since half of the fuel cells 20 originate in air chamber 26a and terminate in combustion chamber 30b, while half of the fuel cells 20 originate in air chamber 26b and terminate in combustion chamber 30a, and the air chambers 26a, 26b and respective outlets defined by combustion chambers 30b, 30a are at opposite ends of the generator, the air flow in half of the fuel cells 20 is countercurrent to the air flow in the other half of the fuel cells 20. Through this arrangement the hotter downstream end of every fuel cell 20 radiates and conducts via the electrical connection to the cooler upstream ends of adjacent fuel cells 20, thus promoting a more uniform temperature along the length of the fuel cells 20.

No attempt need be made to accomplish a perfect seal at the juncture of the fuel cells 20 and the air chambers 26a, 26b, i.e., at the spacers 32a and 32b, since a small leakage of air directly to combustion chambers 30a, 30b is acceptable.

Upon leaving the fuel cells 20, the vitiated air enters the combustion chambers 30a, 30b located at opposite ends of the generator 14. Once again no attempt need be made to accomplish a perfect seal at the juncture of the fuel cells 20 and the combustion chambers 30a, 30b, i.e., at the spacers 34a and 34b. In fact, it is an important aspect of the present "seal-less" generator concept that air and a fraction of the depleted fuel in this region, in a controlled manner.

The reformed fuel entering the generator chamber 14 through the fuel distribution plenum 38 is directed in opposite directions through each of the generator sections 14a, 14b in the passages between the fuel cells 20. In the recirculation plena 40a and 40b, located at the opposite ends of the generator sections 14a, 14b, a fraction of the unburned fuel and products, i.e., depleted fuel, form the recirculated streams passing through the lines 54a, 54b from the recirculation plena 40a, 40b while the remainder is permitted to leak to the combustion chambers 30a, 30b. It should be understood that the depleted fuel and the vitiated air entering the combustion chambers 30a, 30b, as well as any air that leaks from the air chambers 26a, 26b, may safely react within the combustion chambers 30a, 30b to provide heated combustion products for supplying heat to the reformer 46, the recuperative air preheater 24 and/or to the air chambers 26a, 26b.

Figure 2:
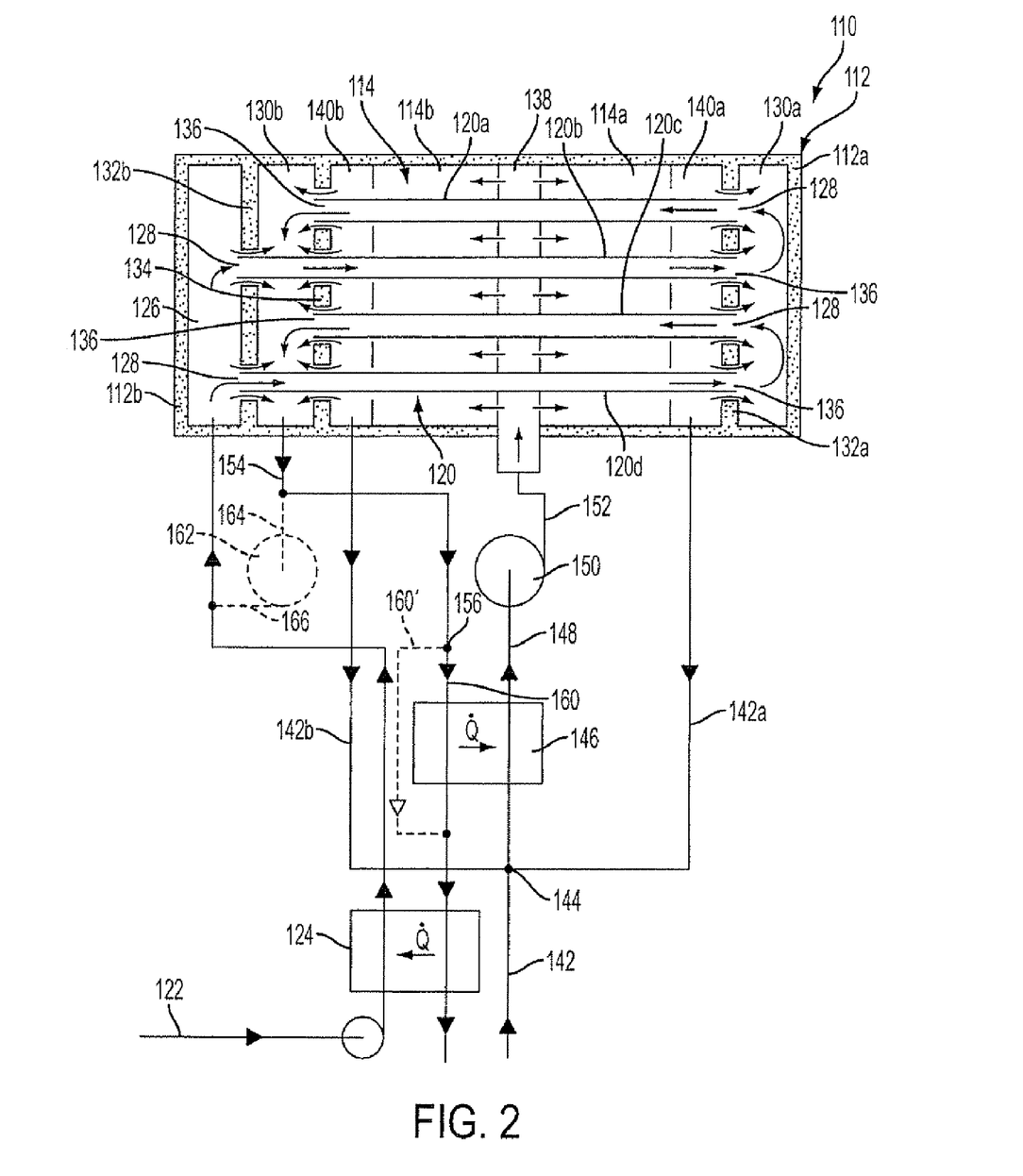
FIG. 2 is a schematic diagram of a second embodiment of a fuel cell generator in accordance with the present invention.

Referring to FIG. 2, a second embodiment of the invention is illustrated comprising a fuel cell generator 110 including a housing 112 defining a plurality of chambers including a generator chamber 114 having a first generator section 114a and a second generator section 114b. The housing 112 further encloses a plurality of elongated fuel cells 120, specifically identified as 120a, 120b, 120c and 120d.

The fuel cells 120 preferably comprise SOFC's. Each of the fuel cells 120 extends through both the first generator section 114a and the second generator section 114b for conveying oxidant, i.e., air, from one end of the housing 112' to an opposite end of the housing 112.

Air is supplied to the housing 112 through an air supply line 122 extending to a recuperative air preheater 124. The line 122 further extends from the recuperative air preheater 124 to the housing 112 wherein air is supplied to an air chamber 126 at a second end 112b of the housing. The air chamber 126 provides air to an entry end 128 of a predetermined first plurality of the fuel cells 120b and 120d. As with the previous embodiment, it should be noted that although only four fuel cells 120 are illustrated, any number of fuel cells 120, and preferably more than four, may be provided in accordance with the present invention, where half of the fuel cells 120 have an entry end at the air chamber 126.

A first combustion chamber 130a, defining a first combustion zone, is located within the housing 112 adjacent to a first end 112a of the housing 112. A first end wall defined by a first end spacer 132a is located between the first combustion chamber 130a and the generator chamber 114. A second combustion chamber 130b, defining a second combustion zone, is located within the housing 112 adjacent to the air chamber 126, and a second end wall defined by a second end spacer 132b is located between the air chamber 126 and the second combustion chamber 130b. An inner wall defined by an inner spacer 134 separates the second combustion chamber 130b from the generator chamber 114. A predetermined second plurality of fuel cells 120a and 120c include an entry end 128 located at the first combustion chamber 130a.

The fuel cells 120 each include an exhaust end 136, where the exhaust ends 136 of the first plurality of fuel cells 120b, 120d exhaust vitiated air to the first combustion chamber 130a, such that the entry ends 128 of the second plurality of fuel cells 120a, 120c receive vitiated air and combustion products. The exhaust ends 136 of the second plurality of fuel cells 120a, 120c exhausts vitiated air to the second combustion chamber 130b.

A fuel distribution plenum 138 extends through a mid-portion of the housing 112, between the housing ends 112a and 112b, transversely of the direction of elongation of the fuel cells 120. The fuel distribution plenum 138 is located between the first and second generator sections 114a and 114*b* and distributes fuel in opposite directions to each of the first and second generator sections 114*a* and 114*b*.

A first recirculation plenum 140*a* is located within the housing 112 at an end of the first generator section 114*a* adjacent the first combustion chamber 130*a*, and a second recirculation plenum 140*b* is located within the housing 112 at an end of the second generator section 114*b* adjacent the second combustion chamber 130*b*. The first and second recirculation plena 140*a*, 140*b* are connected to respective recirculation lines 142*a*, 142*b* of a recirculation circuit for recirculating a portion of the depleted fuel to the fuel distribution plenum 138. In particular, the recirculation lines 142*a*, 142*b* feed a portion of the depleted fuel from the recirculation plena 140*a*, 140*b* to a junction 144 with a fresh fuel supply line 142 upstream from a reformer 146. The reformed fuel is conveyed from the reformer 146 through a fuel line 148 to a recirculator 150 to increase the pressure of the reformed fuel for supplying the fuel through a fuel distribution line 152 to the fuel distribution plenum 138.

A combustion product line 154 extends from the combustion chamber 130*b* to an exhaust line 160. In a first configuration of the exhaust line 160, the exhaust line 160 extends through the reformer 146 to provide heat to the reformer 146 and then through the recuperative air preheater 124 to provide heat to the incoming air. In a second configuration of the exhaust line 160, a bypass line 160' line is provided at a junction 156 to convey the combustion products directly to the recuperative air preheater 124, while the heat for reformation is provided by the recirculated portion of the unburned fuel and products, i.e., depleted fuel, from the process.

In another variation on the structure of FIG. 2, in the case where a relatively low air temperature in the air chamber 126 needs to be mitigated, additional heat may be provided from the combustion chamber 130*b*. Specifically, a portion of the products from the combustion chamber 130*b* may be extracted via an air recirculator 162 drawing a portion of the combustion products through line 164 and directing it to the air chamber 126*a*, such as through connection of a line 166 to the air supply line 122. In addition, heat transfer between the hot exhaust ends 136 of the second plurality of fuel cells 120*a*, 120*c* and the relatively cold entry ends 128 of the first plurality of fuel cells 120*b*, 120*d* may provide further heat the incoming air as it enters the generator 114.

In a process performed by the fuel cell generator 110 in accordance with the embodiment of FIG. 2, air enters the recuperative air preheater 124 where it receives heat from the generator exhaust stream flowing through the exhaust line 160. The air then enters the air chamber 126 before entering fuel cells 120*b*, 120*d* that originate in this chamber 126, pass through generator sections 114*a*, 114*b* and terminate in the first combustion chamber 130*a*. Also entering the first combustion chamber 130*a* is a fraction of the depleted fuel gas which passed through the first generator section 114*a*. This occurs because no attempt is made to produce a perfect seal at the juncture of the fuels cells and the combustion chamber 130*a*, i.e., at the spacer 132*a*. The larger fraction of the fuel gas enters the stream that is carried through the recirculation line 142*a*.

A small fraction of the oxygen in the air stream reacts with the leaking fuel within the first combustion chamber 130*a* so that the second plurality of fuel cells 120*a*, 120*d* which originate in the first combustion chamber 130*a* and terminate in the second combustion chamber 130*b* carry vitiated air and combustion products. The vitiated air and combustion products flow through the second plurality of fuel cells 120*a*, 120*c* in a direction opposite to that of the flow through the first plurality of fuel cells 120*b*, 120*d*.

Within the second combustion chamber 130*b*, oxygen in the air stream reacts with a fraction of the depleted fuel gas which has passed through second generator section 114*b*. This fraction is allowed to leak from the second generator section 114*b* to the second combustion chamber 130*b* because no attempt is made to form a perfect seal between the inner spacer 134 and the fuel cells 120. The larger fraction of the depleted fuel gas enters the stream that is carried through the recirculation line 142*b*.

The reformed fuel entering the generator chamber 114 through the fuel distribution plenum 138 is directed in opposite directions through each of the generator sections 114*a*, 114*b* in the passages between the fuel cells 120. In the recirculation plena 140*a* and 140*b*, located at the opposite ends of the generator sections 114*a*, 114*b*, a fraction of the unburned fuel and products form the recirculated streams passing through the lines 154*a*, 154*b* from the recirculation plena 140*a*, 140*b* while the remainder is permitted to leak to the combustion chambers 130*a*, 130*b*.

Figure 3:
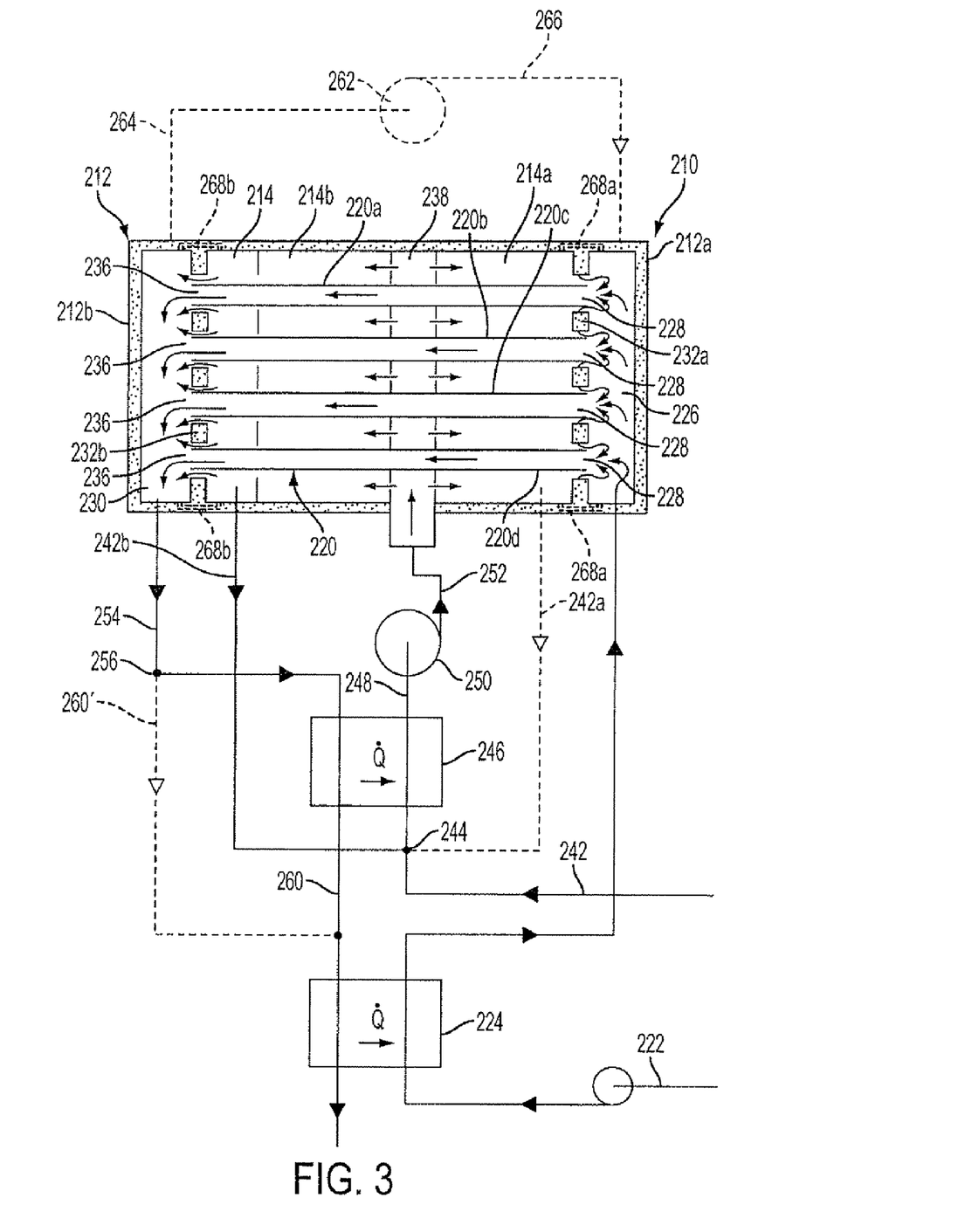
FIG. 3 is a schematic diagram of a third embodiment of a fuel cell generator in accordance with the present invention.

Referring to FIG. 3, a third embodiment of the invention is illustrated comprising a fuel cell generator 210 including a housing 212 defining a plurality of chambers including a generator chamber 214 having a first generator section 214*a* and a second generator section 214*b*. The housing 212 further encloses a plurality of elongated fuel cells 220, specifically identified as 220*a*, 220*b*, 220*c* and 220*d*. The fuel cells 220 preferably comprise SOFC's. Each of the fuel cells 220 extends through both the first generator section 214*a* and the second generator section 214*b* for conveying oxidant, i.e., air, from one end of the housing 212 to an opposite end of the housing 212.

Air is supplied to the housing 212 through an air supply line 222 extending to a recuperative air preheater 224. The line 222 further extends from the recuperative air preheater 224 to the housing 212 wherein air is supplied to an air chamber 226 at a first end 212*a* of the housing. The air chamber 226 provides air to an entry end 228 of the fuel cells 220. As with the previous embodiments, it should be noted that although only four fuel cells 220 are illustrated, any number of fuel cells 220, and preferably more than four, may be provided in accordance with the present invention, where all of the fuel cells 220 have an entry end 228 at the air chamber 226.

A primary combustion chamber 230, defining a first or primary combustion zone, is located within the housing 212 adjacent to a second end 212*b* of the housing 212. The air chamber 226 additionally defines a secondary combustion zone, as will be described further below. A first end wall defined by a first end spacer 232*a* is located between the air chamber 226 and the generator chamber 214. A second end wall defined by a second end spacer 232*b* is located between the primary combustion chamber 230 and the generator chamber 214. The fuel cells 220 each include an exhaust end 236, where the exhaust ends 236 of the fuel cells 220 exhaust vitiated air to the primary combustion chamber 230.

A fuel distribution plenum 238 extends through a midportion of the housing 212, between the housing ends 212*a* and 212*b*, transversely of the direction of elongation of the fuel cells 220. The fuel distribution plenum 238 is located between the first and second generator sections 214*a* and 214*b* and distributes fuel in opposite directions to each of the first and second generator sections 214*a* and 214*b*.

A recirculation plenum 240 is located within the housing 212 at an end of the second generator section 214*b* adjacent the primary combustion chamber 230. The recirculation plenum 240 is connected to a recirculation line 242*b* of a recirculation circuit for recirculating a substantial portion of the depleted fuel to the fuel distribution plenum 238. In particular, the recirculation line 242b feeds a portion of the depleted fuel from the recirculation plenum 240 to a junction 244 with a fresh fuel supply line 242 upstream from a reformer 246. The reformed fuel is conveyed from the reformer 246 through a fuel line 248 to a recirculator 250 to increase the pressure of the reformed fuel for supplying the fuel through a fuel distribution line 252 to the fuel distribution plenum 238. In an alternative configuration of the recirculation circuit, an additional recirculation line 242a may conduct depleted fuel from the first generator section 214a to the junction 244 with the fresh fuel line 242.

A combustion product line 254 extends from the primary combustion chamber 230 to an exhaust line 260. In a first configuration of the exhaust line 260, the exhaust line 260 extends through the reformer 246 to provide heat to the reformer 246 and then through the recuperative air preheater 224 to provide heat to the incoming air. In a second configuration of the exhaust line 260, a bypass line 260' line is provided at a junction 256 to convey the combustion products directly to the recuperative air preheater 224, while the heat for reformation is provided by the recirculated portion of the unburned fuel and products, i.e., depleted fuel, from the process.

In another variation on the structure of FIG. 3, in the case where a relatively low air temperature in the air chamber 226 needs to be mitigated, additional heat may be provided from the primary combustion chamber 230. Specifically, a portion of the products from the primary combustion chamber 230 may be extracted via an air recirculator 262 drawing a portion of the combustion products through line 264 and directing it to the air chamber 226 through a line 266.

In a process performed by the fuel cell generator 210 in accordance with the embodiment of FIG. 3, air enters the recuperative air preheater 224 where it receives heat from the generator exhaust stream flowing through the exhaust line 260. The air then enters the air chamber 226 wherein a portion of the air combusts with a fraction of fuel from the depleted fuel stream that is allowed to leak from first generator section 214a. A controlled leakage of the fuel from the generator chamber 214 results from constructing the juncture between the first end spacer 232a and the fuel cells without attempting to produce a perfect seal at this juncture. Accordingly, the air chamber 226 is also a secondary combustion zone. Combustion in the air chamber 226 preheats the air plus products stream as it enters the fuel cells 220. The degree of preheat depends upon the amount of fuel leakage. This effect reduces the requirements for the size and effectiveness of the recuperative air preheater 224 that is required to bring the air to a satisfactory intake temperature. In addition, ports 268a may be provided extending from the first generator section 214a to the air chamber 226 to provide a metered relatively free flow of depleted fuel for mixing with the incoming air. The relatively free flow provided by the ports 268a may result in a relatively small amount of the depleted fuel leaking through spaces at the juncture between the fuel cells 220 and the first end spacer 232a, while a substantially controlled amount of the depleted fuel is provided through the ports 268a.

After passing through the fuel cells 220, the vitiated air is discharged into the primary combustion chamber 230 where it may combust with a fraction of the depleted fuel that has passed through generator section 214b. This fraction of depleted fuel is allowed to leak from the generator chamber 214 to the primary combustion chamber 230 because no attempt is made to produce a perfect seal at the juncture between the second end spacer 232b and the fuel cells 220. In addition, ports 268b may be provided extending from the second generator section 214b to the primary combustion chamber 230 to provide a metered relatively free flow of depleted fuel for mixing with the vitiated air. The relatively free flow provided by the ports 268b may result in a relatively small amount of the depleted fuel leaking through spaces at the juncture between the fuel cells 220 and the second end spacer 232b, while a substantially controlled amount of the depleted fuel is provided through the ports 268b.

The reformed fuel entering the generator chamber 214 through the fuel distribution plenum 238 is directed in opposite directions through each of the generator sections 214a, 214b in the passages between the fuel cells 220. In the recirculation plenum 240, a fraction of the unburned fuel and products form the recirculated stream passing through the line 154 while the remainder of the unburned fuel and products is permitted to leak to the combustion chamber 130.

Figure 7:
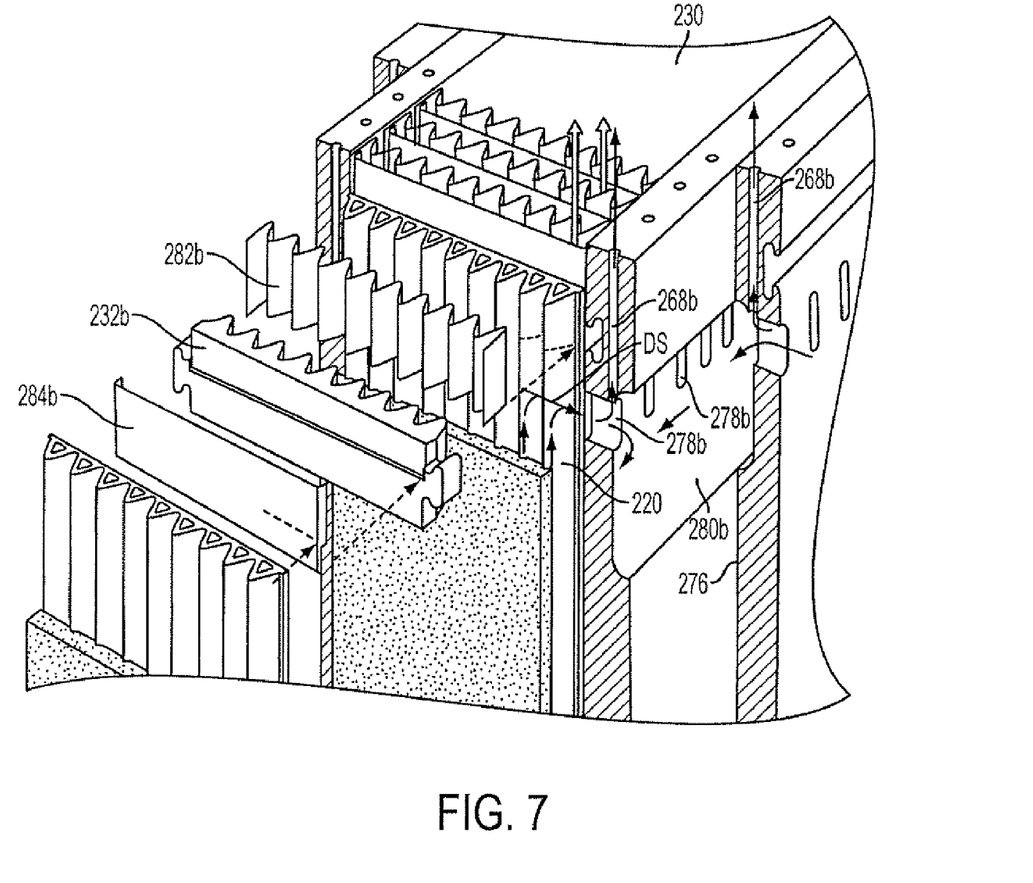
FIG. 7 is a perspective, partially exploded view showing a section of a second end of the fuel cell generator illustrated in FIG. 3.
Figure 8:
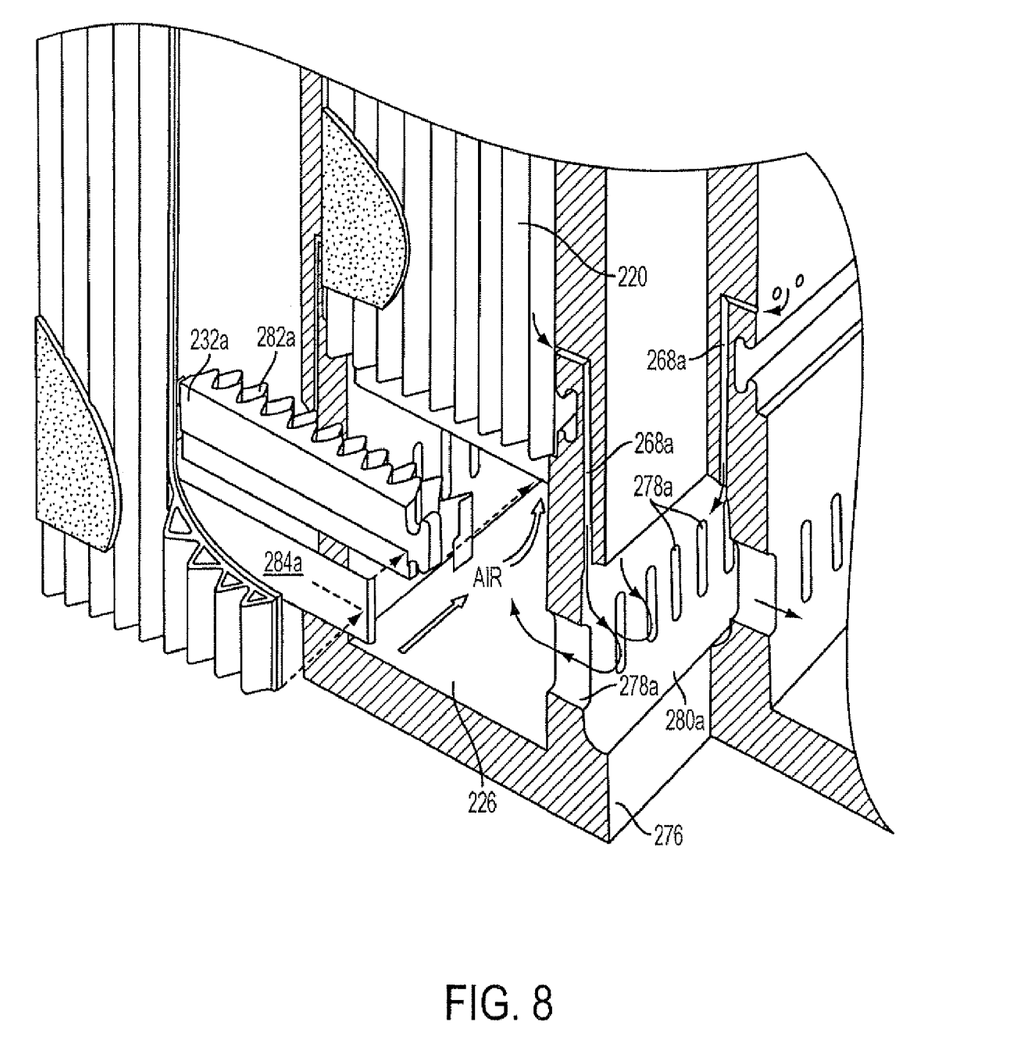
FIG. 8 is a perspective, partially exploded view showing a section of a first end of the fuel cell generator illustrated in FIG. 3.

FIGS. 4-8 further illustrate, diagrammatically and with additional detail, the configurations of the invention described above with reference to FIGS. 1-3. Specifically, FIGS. 4-6 describe particular detail that may be found in the embodiments of FIGS. 1-3, where reference numerals in FIGS. 4-6 identify elements corresponding to those referenced in the first embodiment. FIGS. 7 and 8 describe particular detail that may be found in the embodiments of FIG. 3, where reference numerals in FIGS. 7 and 8 identify elements corresponding to those referenced in the third embodiment.

Figure 4:
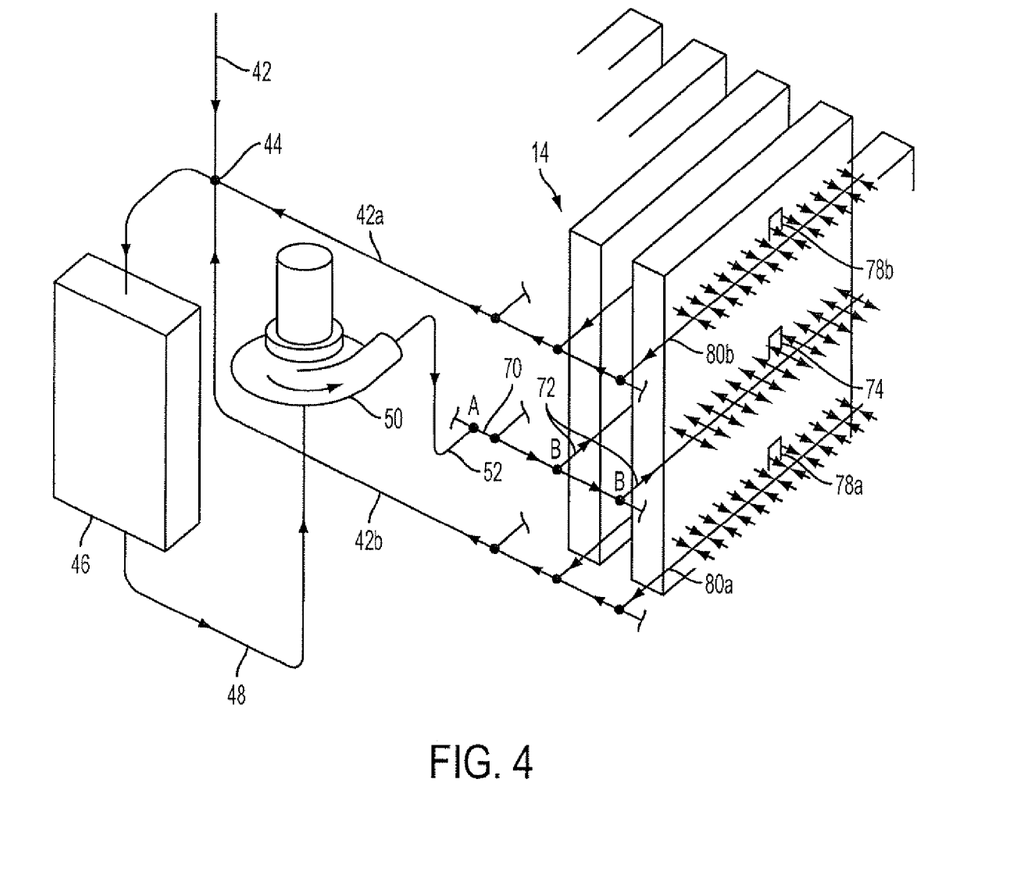
FIG. 4 is a diagrammatic illustration of the recirculation circuit for the embodiments of FIGS. 1-3.

FIG. 4 diagrammatically illustrates a fuel recirculation loop in which the recirculator 50 comprises a centrifugal recirculator located downstream from the reformer 46 to provide a predetermined pressure head for supplying the fuel to the generator chamber 14. Optionally, and depending on the needed head rise, an ejector pump 50' may be provided, see FIG. 6. The ejector pump 50' would be located in the fresh fuel line 42 upstream from the reformer 46 and the fresh fuel entering the nozzle of the ejector pump 50' would act as the motive fluid for induction of the recirculated fuel stream from the recirculation lines 42a and 42b, see FIG. 6.

As seen in FIG. 4, the combined streams of fresh fuel and recirculated fuel pass through the reformer 46 and the fully reformed stream enters a lateral distribution plenum 70 at point A, and subsequently enters row feed distribution manifolds 72, at point B. The distribution manifolds 72 are defined in lateral side walls 76 and are located close to the mid-elevation of the fuel cell stack, and their number is equal to the number of fuel cell rows plus one. Slots 74 extending through the lateral side walls 76 feed the reformed fuel to spaces S between adjacent fuel cells 20. By this means each fuel cell row is fed from both sides, see FIG. 5.

Figure 5:
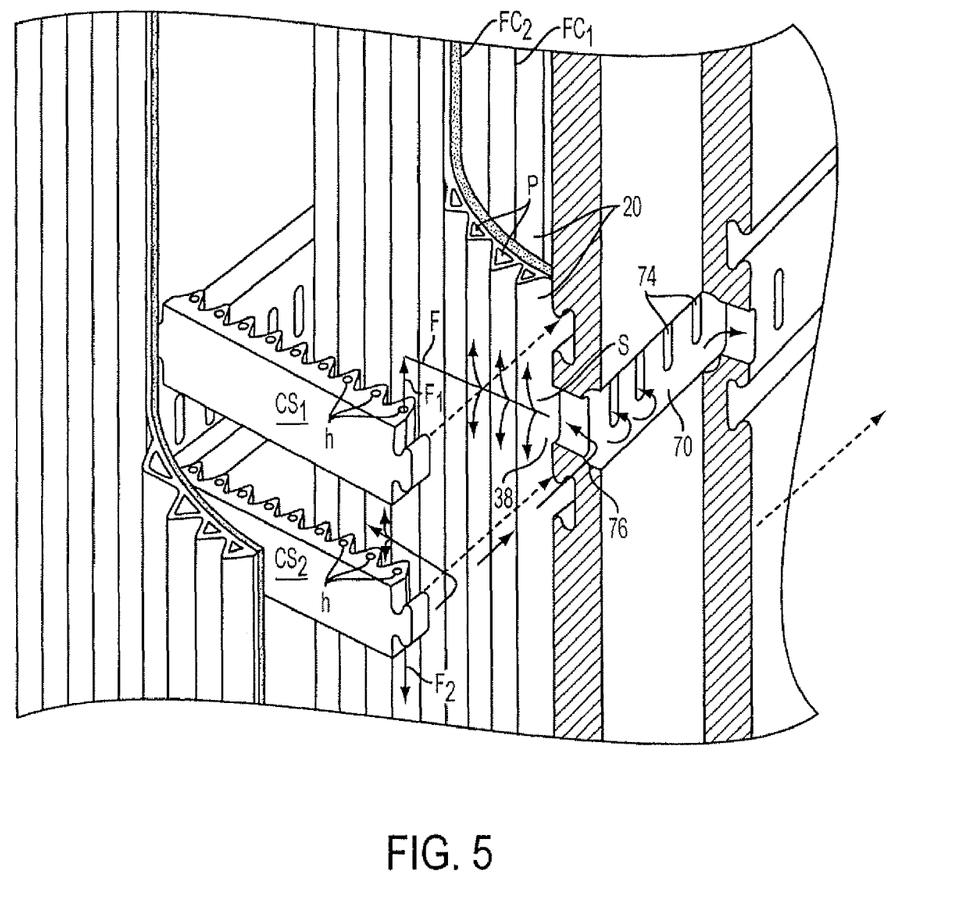
FIG. 5 is a perspective, partially exploded view of a section of the fuel cell generator of FIGS. 1-3.
Figure 6:
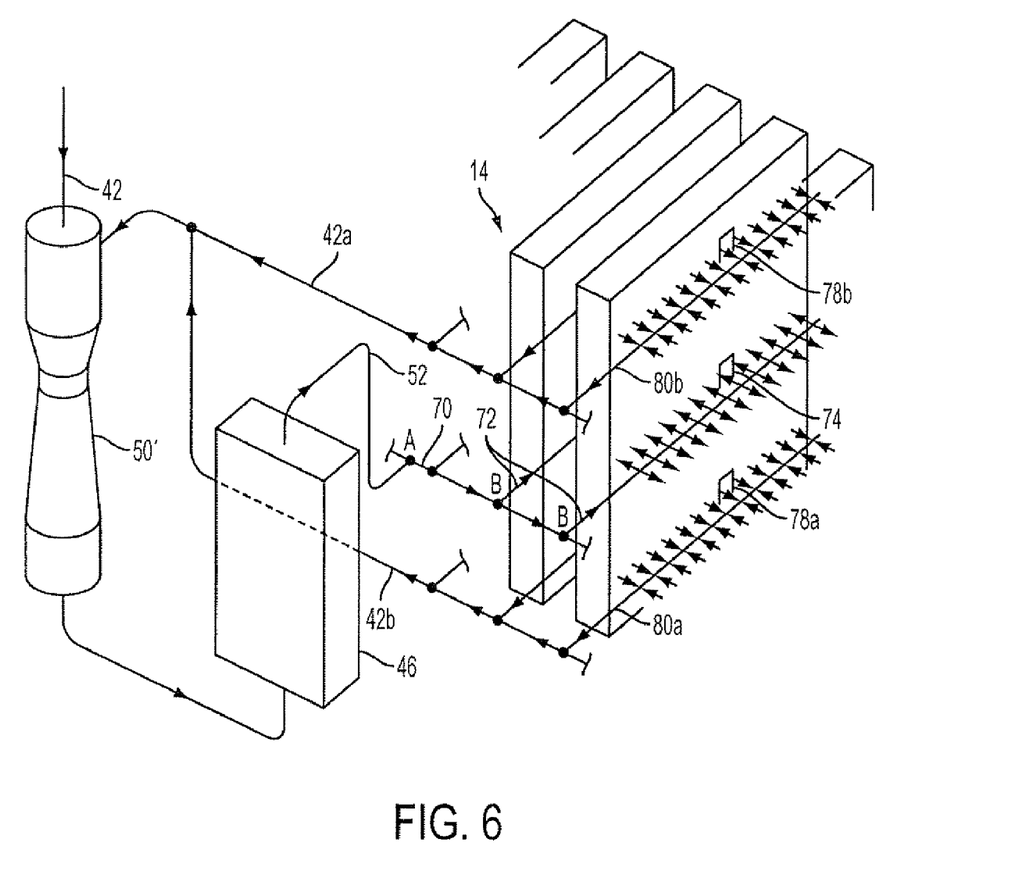
FIG. 6 is a diagrammatic illustration of an alternative embodiment of the recirculation circuit illustrated in FIG. 4.

After entering the space between fuel cells 20 the fuel stream F divides with a fraction $F_1$ passing upwards through holes h in a cell spacer $CS_1$ and a fraction $F_2$ passing downwards through holes h in a cell spacer $CS_2$. The cell spacers $CS_1$ and $CS_2$ separate and define the space S between the adjacent fuel cells 20 and further define the area of the fuel distribution plenum 38.

It should be noted that the illustrated fuel cells have a cell geometry in which a lanthanum manganite air electrode has the geometric form of a number of integrally connected elements of triangular cross section. These cells are referred to as Delta X cells where Delta is derived from the triangular shape of the elements and X is the number of elements. The configuration illustrated herein comprises a Delta 9 cell. The resulting overall cross section has a flat face on one side and a multi-faceted face on the other side. Air flows within discrete passages P of triangular shape, see FIG. 5. A lanthanum chromite interconnection covers the flat face. A yttria-stabilized zirconia electrolyte covers the multifaceted face $FC_1$ and overlaps the edges of the interconnection but leaves most of the interconnection exposed. A nickel/yttria stabilized zirconia fuel electrode covers most of the electrolyte but leaves a narrow margin of electrolyte between the interconnection and the fuel electrode. Series electrical connections between cells is accomplished by means of a flat nickel felt or nickel foam panel, one face of which is sintered to the interconnection while the other face $FC_2$ contacts the apexes of the triangular multifaceted fuel electrode face $FC_1$ of the adjacent cell. As seen in FIG. 5, fuel may flow in the discrete passages that are formed between the fuel electrode coated facets of the corrugated face $FC_1$ of one cell and the nickel felt (or foam) covered flat interconnection face $FC_2$ of the adjacent cell.

Returning to FIG. 4, depleted fuel passes through slots 78a formed in bottom recirculation manifolds 80a which flank the cell row at the bottom of the fuel cell stack, see also FIG. 8 (slots 278a and manifolds 280a correspond to slots 78a and manifolds 80a, respectively). Similarly, depleted fuel passes through slots 78b formed in top recirculation manifolds 80a which flank the cell row at the top of the fuel cell stack, see also FIG. 7 (slots 278b and manifolds 280b correspond to slots 78b and manifolds 80b, respectively). The top and bottom recirculation manifolds 80b and 80a discharge into the top and bottom lateral collection manifolds or recirculation lines 42b and 42a to convey the depleted fuel to the junction 44 to combine with fresh fuel, see FIGS. 4 and 6.

Within the combustion zones, where fuel that is permitted to leak from the generator section joins vitiated air that has passed through the fuel cells, it is necessary to ensure that combustion of the fuel takes place at a point that is displaced from the open ends of the fuel cells. FIGS. 7 and 8 illustrate a means for accomplishing this, and in particular illustrates such a structure with reference to the once through air flow configuration of FIG. 3.

Referring initially to FIG. 7, which illustrates the primary combustion zone 230, the depleted fuel stream DS passes out of the second generator section 214b through the slots 278b and enters the top recirculation manifold 280b formed in the lateral side wall 276. Most of this stream continues in the recirculation manifold 280b and ultimately enters the top lateral collection manifold, i.e., recirculation line 242b. A lesser fraction passes through the ports 268b which release the depleted fuel to the primary combustion zone 230 at points displaced from the ends of the fuel cells 220. By providing this relatively free passage of depleted fuel to the combustion zone 230, a relatively small amount of fuel will leak through the spacers 232b or between any small gaps that might exist between the spacers 232b and the fuel cells 220. Hence, combustion of the fuel will not take place on the end of the cell cap section 282b and 284b. The cell cap section 282b and 284b shields the fuel from the air until it is mixed at least a centimeter above the ends of the fuel cell 220.

The cell cap section 282b, 284b comprises two pieces formed from NEXTEL® fabric. The fabric is saturated with alumina cement and the pieces of the cell cap section 282b, 284b are formed to their respective shapes within molds. One mold replicates the delta form of the fuel electrode side of the cell. The other mold replicates the flat interconnection side of the cell. Both of the pieces are then baked and finally painted with a nickel acetate catalyst.

Referring to FIG. 8, a similar arrangement to that described for FIG. 7 is provided for the air chamber/secondary combustion zone 226. In particular, a relatively free passage for the depleted fuel is provided through the ports 268a from the end of the first generator section 214a to the bottom recirculation manifold 280a and the air chamber 226. A plurality of slots 278a are provided from the recirculation manifold 280a to the air chamber 226 at locations displaced from the ends of the fuel cells 220. By providing this relatively free passage of the depleted fuel from the first generator section 214b to the recirculation manifold 280a and to the air chamber 226, a relatively small amount of fuel will leak through the spacers 232a or between any small gaps that might exist between the spacers 232a and the fuel cells 220. Hence, combustion of the fuel will not take place on the end of the cell cap section 282a and 284a. The cell cap section 282a and 284a shields the fuel from the air until it is mixed at least a centimeter below the ends of the fuel cell 220. Further, in an alternative configuration, the bottom recirculation manifold 280a may be additionally connected to a recirculation line 242a for recirculating a fraction of the depleted fuel to the reformer 246, see FIG. 3.

It should be understood that the present invention is not limited to the described Delta X construction and that other cell configurations may be used. For example, without limitation, cells of a flattened parallel sided cross section may be provided, where the cells that have a number of ribs connecting the adjacent parallel sides of a lanthanum manganite air electrode extrusion. An air flow is provided within discrete passages that are formed between the ribs and flat sides of the air electrode. These cells are referred to as HPDX cells where HPD indicates "high power density" and X indicates the number of air passages. In HPD cells a lanthanum chromite interconnection is deposited over the entirety of one flat face of the air electrode. A yttria stabilized zirconia electrolyte covers the opposite face and the rounded edges of the air electrode so as to overlap the edges of the interconnection surface but leave most of this surface exposed. A nickel/yttria stabilized zirconia cermet fuel electrode covers the electrolyte except for a narrow margin of electrolyte that surrounds the interconnection. Series electrical connections between cells is accomplished by means of a nickel felt structure, a flat face of which is sintered to the interconnection while the raised ribs of which are sintered to the fuel electrode face of an adjacent cell. Other cell configurations not specifically described herein may be implemented within the present invention.

The three generator configurations described herein represent structure to provide open-ended once-through cells without the need for providing high temperature seals at the ends of the fuel cells, and thus provides a "seal-less" construction for the fuel cell generator. Furthermore, the structure described herein mitigates the low cell temperature effect at the end of the cell where the air is introduced, which effect may typically be present when eliminating the central air feed tube from the fuel cell. The described embodiments additionally feature fuel feed at nominally mid stack elevation, thus facilitating the use of longer cells in that the air pressure drop is reduced relative to prior art air feed tube designs. The resulting design may be characterized by a smaller foot-print and reduced parts count for a given power output. It should also be noted that in all three embodiments the pressure on the fuel side is higher than the pressure on the air side, thus ensuring that any leakage at the ends of the generator chamber results in depleted fuel leaking toward the ends to adjacent chambers, rather than air passing inwardly into contact with the fuel in the generator chamber.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A solid fuel oxide fuel cell generator comprising:
a housing defining a plurality of chambers including a generator chamber and first and second combustion zones located adjacent to opposite ends of said generator chamber;
said generator chamber including first and second generator sections, said first and second generator sections located between said first and second combustion zones;
a plurality of elongated fuel cells, each said fuel cell extending through said first and second generator sections and including opposing open ends wherein each said open end opens into one of said chambers defined within said housing;
an oxidant supply supplying oxidant to said housing;
a fuel distribution plenum extending transversely to said elongated fuel cells through said generator chamber and located between and distributing fuel to said first and second generator sections; and
wherein said first and second combustion zones receive a portion of the fuel passing through said first and second generator sections, respectively, said portion of the fuel comprising depleted fuel from said generator chamber.

2. The generator of claim 1, wherein each of said fuel cells open into at least one of said combustion zones.

3. The generator of claim 2, including first and second oxidant chambers located adjacent each of said combustion zones, each said oxidant chamber receiving oxidant from said oxidant supply and supplying oxidant to a predetermined number of said fuel cells.

4. The generator of claim 2, wherein said first combustion zone receives vitiated oxidant from a first set of said fuel cells and mixes said vitiated oxidant with a fraction of said depleted fuel from said generator chamber, and a second set of fuel, cells conveys said vitiated oxidant and depleted fuel to said second combustion zone.

5. The generator of claim 2, wherein said second combustion zone comprises an oxidant chamber receiving oxidant from said oxidant supply where said depleted fuel from said generator chamber mixes with said oxidant prior to entering said fuel cells.

6. A fuel cell generator comprising:
a housing defining a plurality of chambers including a generator chamber having first and second generator sections;
a plurality of elongated fuel cells, each said fuel cell extending through said first and second generator sections and including opposing open ends wherein each said open end opens into one of said chambers defined within said housing;
an oxidant supply supplying oxidant to said housing;
a fuel distribution plenum extending transversely to said elongated fuel cells through said generator chamber and located between and distributing fuel to said first and second generator sections; and
wherein said oxidant passes through a first set of said fuel cells in a first direction and each of said first set of fuel cells includes an exhaust end that opens into a first combustion zone, and said oxidant passes through a second set of said fuel cells in a second direction opposite to said first direction and each of said second set of fuel cells includes an exhaust end that opens into a second combustion zone.

7. The generator of claim 6, wherein one or more of said chambers comprise a combustion zone, and oxidant entering said housing is caused to pass through at least one of said one or more combustion zones prior to passing through said generator sections.

8. The generator of claim 6, wherein at least two of said chambers comprise oxidant chambers located at opposite ends of said housing for receiving oxidant from said oxidant supply and supplying oxidant to said open ends of said fuel cells.

9. The generator of claim 8, including a chamber defining each said combustion zone located between each of said oxidant chambers and one of said first and second generator sections, and each of said fuel cells open into one of said combustion zones chambers where a fraction of depleted fuel from said generator sections reacts with vitiated oxidant exiting said fuel cells.

10. The generator of claim 9, including a recirculation plenum adjacent each of combustion zones and connected to a recirculation circuit for recirculating depleted fuel to said fuel distribution plenum.

11. The generator of claim 6, wherein at least one of said chambers comprises an oxidant chamber receiving oxidant from said oxidant supply and including a first combustion zone located at an end of said housing opposite from said oxidant chamber, and said oxidant passing through said second set of fuel cells comprises an oxidant from said first set of fuel cells that has partially reacted with depleted fuel from said first generator section within said first combustion zone.

12. The generator of claim 11, including a second combustion zone located between said oxidant chamber and one of said first and second generator sections wherein said oxidant passing through said second set of fuel cells exits said second set of fuel cells into said second combustion zone and reacts with depleted fuel from said second generator section.

13. The generator of claim 12, including a recirculation plenum adjacent each of combustion zones and connected to a recirculation circuit for recirculating depleted fuel to said fuel distribution plenum.

* * * * *